United States Patent
Kaseya

(10) Patent No.: US 8,454,169 B2
(45) Date of Patent: Jun. 4, 2013

(54) ILLUMINATION DEVICE AND PROJECTOR

(75) Inventor: Hiroyasu Kaseya, Suwa (JP)

(73) Assignee: Seiko Epson Corporation (JP)

( * ) Notice: Subject to any disclaimer, the term of this patent is extended or adjusted under 35 U.S.C. 154(b) by 267 days.

(21) Appl. No.: 12/897,165

(22) Filed: Oct. 4, 2010

(65) Prior Publication Data
US 2011/0116053 A1 May 19, 2011

(30) Foreign Application Priority Data
Nov. 17, 2009 (JP) .................. 2009-261732

(51) Int. Cl.
*G03B 21/14* (2006.01)
(52) U.S. Cl.
USPC .............. 353/38; 353/30; 353/31; 353/34; 353/89; 353/94; 353/98; 353/99
(58) Field of Classification Search
USPC .... 353/30, 31, 34, 48, 89, 94, 98, 99; 362/19, 362/244–246, 268, 331, 551, 561, 800; 359/618, 359/619, 622, 623, 624
See application file for complete search history.

(56) References Cited

U.S. PATENT DOCUMENTS

| 5,237,367 | A * | 8/1993 | Kudo | 355/67 |
| 6,414,795 | B1 * | 7/2002 | Sugawara | 359/622 |
| 6,547,421 | B2 * | 4/2003 | Sugano | 362/268 |
| 6,577,429 | B1 * | 6/2003 | Kurtz et al. | 359/279 |
| 6,921,176 | B2 * | 7/2005 | Tomita et al. | 353/94 |
| 7,136,035 | B2 * | 11/2006 | Yoshida | 345/87 |
| 7,303,291 | B2 * | 12/2007 | Ikeda et al. | 353/102 |
| 7,537,347 | B2 * | 5/2009 | Dewald | 353/38 |
| 7,575,328 | B2 * | 8/2009 | Inoko | 353/38 |
| 2003/0142275 | A1 * | 7/2003 | Yoshida | 353/31 |
| 2004/0196443 | A1 * | 10/2004 | Tomita et al. | 353/94 |
| 2009/0040753 | A1 | 2/2009 | Matsumoto et al. | |

FOREIGN PATENT DOCUMENTS

| EP | 0 985 952 | 3/2000 |
| JP | 2009-042637 | 2/2009 |
| WO | 99-49358 | 9/1999 |

* cited by examiner

*Primary Examiner* — Georgia Y Epps
*Assistant Examiner* — Sultan Chowdhury
(74) *Attorney, Agent, or Firm* — Harness, Dickey & Pierce, P.L.C.

(57) ABSTRACT

An illumination device includes: a light source which emits a plurality of emission lights; a first condenser lens which stacks the plural emission lights emitted from the light source; a first fly-eye lens which divides lights stacked by the first condenser lens into a plurality of partial lights; a second fly-eye lens which converges the plural partial lights; and a second condenser lens which stacks the plural partial lights converged by the second fly-eye lens, wherein the first condenser lens stacks the plural emission lights emitted from the light source on the first fly-eye lens, and the second fly-eye lens stacks the plural partial lights on an illumination receiving area.

8 Claims, 11 Drawing Sheets

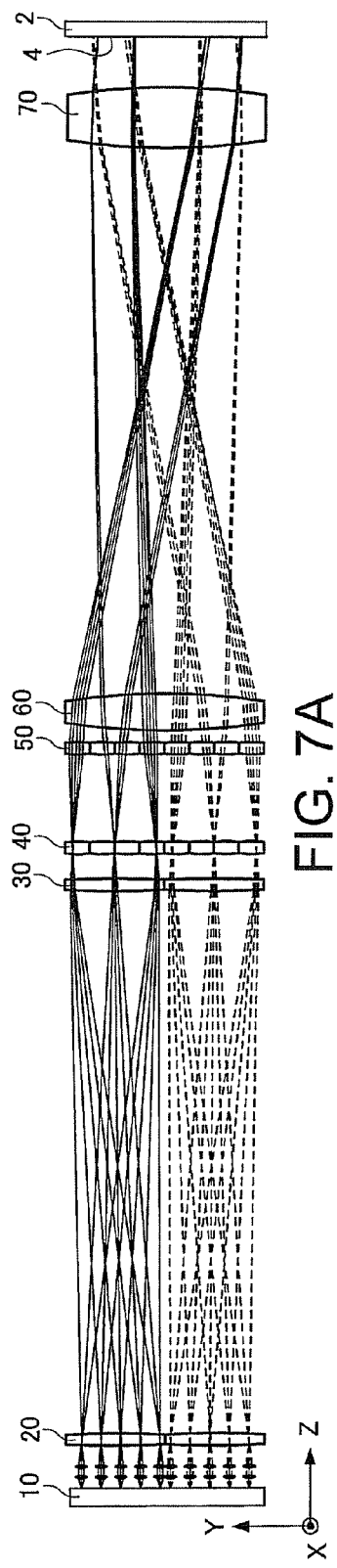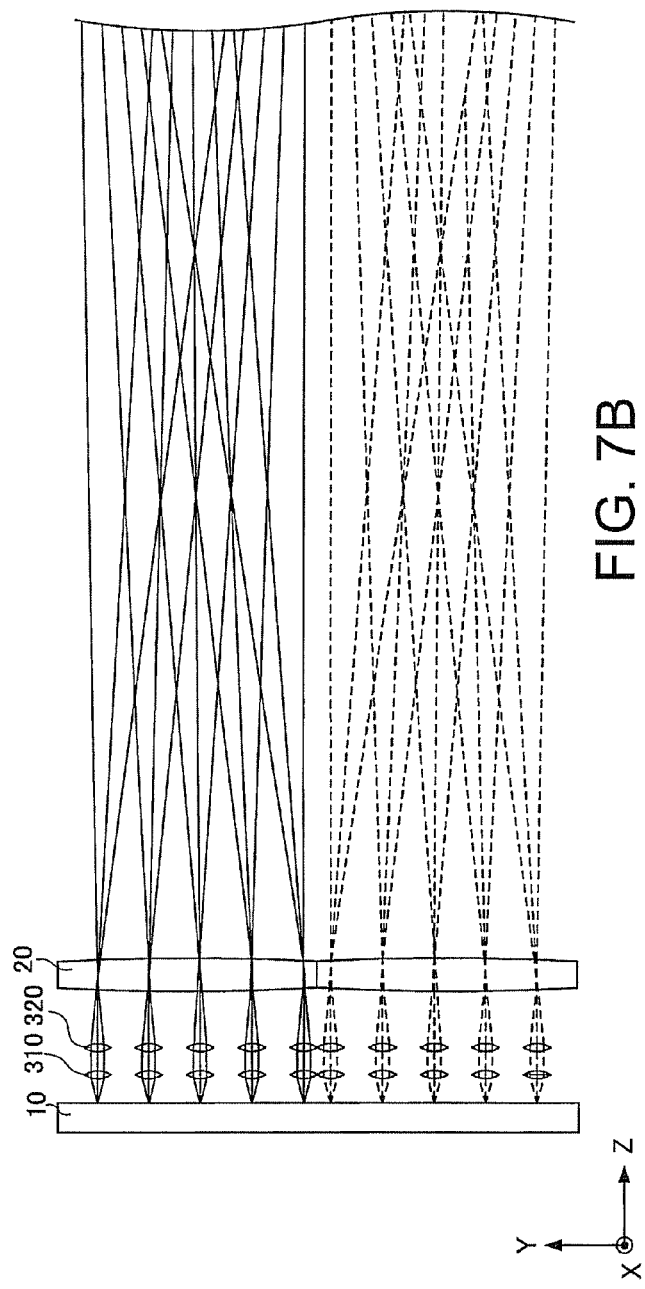
FIG. 7A
FIG. 7B

| LENS | LENS SURFACE | DISTANCE (mm) | RADIUS OF CURVATURE (mm) |
|---|---|---|---|
| (LIGHT SOURCE 10) | | 0.7 | |
| COLLIMATING LENS 310 | FIRST SURFACE (COLLIMATING SURFACE) | 1.0 | 0.36063 |
| CONVERGING LENS 320 | SECOND SURFACE (CONVERGING SURFACE) | 1.7 | -1.4 |
| FIRST CONDENSER LENS 20 | FIRST SURFACE | 1.0 | 50 |
| | SECOND SURFACE | 44.0 | -50 |
| FIRST FIELD LENS 30 | FIRST SURFACE | 1.0 | 50 |
| | SECOND SURFACE | 2.0 | -50 |
| FIRST FLY-EYE LENS 40 (ELEMENT LENS 42) | FIRST SURFACE | 1.0 | 8.1 |
| | SECOND SURFACE | 7.2 | -8.1 |
| SECOND FLY-EYE LENS 50 (ELEMENT LENS 52) | FIRST SURFACE | 1.0 | 8.1 |
| | SECOND SURFACE | 1.0 | -8.1 |
| SECOND CONDENSER LENS 60 | FIRST SURFACE | 3.0 | 51 |
| | SECOND SURFACE | 44.0 | -51 |
| SECOND FIELD LENS 70 | FIRST SURFACE | 5.0 | 51 |
| | SECOND SURFACE | 4.0 | -51 |

FIG. 8

ILLUMINATION DEVICE AND PROJECTOR

BACKGROUND

1. Technical Field

The present invention relates to an illumination device and a projector.

2. Related Art

Recently, a projector which includes an illumination device provided with a solid light source such as a semiconductor laser, a super luminescent diode (SLD), and a light emitting diode (LED) has been developed or commercialized as a product. The solid light source is small and lightweight, and has considerably high light emission luminance as a result of recent development. Thus, the solid light source is suited for a light source of an illumination device. For example, WO99/49358 discloses a light source of an illumination device which includes a plurality of semiconductor lasers disposed in the form of two-dimensional arrays. This structure allows the illumination device to produce high output.

According to the illumination device having the plural semiconductor lasers, however, the light source is constituted only by a collection of point light sources. In this case, unevenness of illuminance is produced on an illumination receiving area even when uniform illumination on the illumination receiving area is desired. For overcoming this drawback, the illumination device of this type requires an additional optical system for reducing illuminance unevenness of illumination light in some cases. For example, JP-A-2009-42637 discloses a technology of an illumination device having plural laser beam sources, the device reduces illuminance unevenness of illumination light on the illumination receiving area by shifting laser beam entrance areas for entering a fly-eye lens such that intensity patterns of lights stacked on the illumination receiving area can be increased.

SUMMARY

An advantage of some aspects of the invention is to provide an illumination device capable of reducing illuminance unevenness of illumination light.

An illumination device according to a first aspect of the invention includes: a light source which emits a plurality of emission lights; a first condenser lens which stacks the plural emission lights emitted from the light source; a first fly-eye lens which divides lights stacked by the first condenser lens into a plurality of partial lights; a second fly-eye lens which converges the plural partial lights; and a second condenser lens which stacks the plural partial lights converged by the second fly-eye lens. The first condenser lens stacks the plural emission lights emitted from the light source on the first fly-eye lens. The second fly-eye lens stacks the plural partial lights on an illumination receiving area.

According to this illumination device, the plural emission lights emitted from the light source can be stacked on the first fly-eye lens when supplied thereto by using the first condenser lens. Thus, illuminance unevenness of illumination light can be reduced.

In the illumination device of the above aspect of the invention, the plural first condenser lenses may be disposed within a plane crossing the optical axes of the plural emission lights emitted from the light source, and the plural emission lights emitted from the light source may be stacked on the first fly-eye lens by each of the first condenser lenses.

According to this illumination device, the incident angles of the lights entering the fly-eye lens can be decreased. Thus, the efficiency of using light can improve.

In the illumination device of the above aspect of the invention, the distance between the first condenser lens and the first fly-eye lens may be longer than the focal distance of the first condenser lens, and the diameter of the lights stacked on the light entrance surface of the first fly-eye lens by the first condenser lens may be shorter than the effective diameter of the first condenser lens.

According to this illumination device, the efficiency of using light can improve.

In the illumination device of the above aspect of the invention, the first fly-eye lens may have a plurality of first element lenses disposed within a plane crossing the lights stacked by the first condenser lens at right angles, the second fly-eye lens may have a plurality of second element lenses disposed within a plane crossing the lights received from the first fly-eye lens at right angles, and an effective diameter $Sf$ of each of the second element lenses may satisfy the following expression (1):

$$Sf \geq f2 \times Ss/f1 \qquad (1)$$

($Ss$: effective diameter of the first condenser lens, $f1$: focal distance of the first condenser lens, $f2$: focal distance of each of the first element lenses).

According to this illumination device, the effective diameter of each of the second element lenses of the second fly-eye lens can be made longer than each beam diameter of the lights entering the second element lenses (partial lights). Thus, the efficiency of using light can improve.

The illumination device of the above aspect of the invention may further include a plurality of converging lenses provided in correspondence with the plural emission lights on an optical path between the light source and the first condenser lens to individually converge the plural emission lights emitted from the light source.

According to this illumination device, the efficiency of using light can improve.

The illumination device of the above aspect of the invention may further include a plurality of collimating lenses provided in correspondence with the plural emission lights on an optical path between the light source and the converging lenses to individually convert the plural emission lights emitted from the light source into collimated lights.

According to this illumination device, the incident angles of the lights entering the fly-eye lens can be easily controlled by the first condenser lens. Thus, the degree of freedom in designing can increase.

The illumination device of the above aspect of the invention may further include a field lens disposed on an optical path between the first condenser lens and the first fly-eye lens to converge the lights stacked by the first condenser lens on the first fly-eye lens.

According to this illumination device, the efficiency of using light can further improve.

In the illumination device of the above aspect, the light source may be a semiconductor laser, a super luminescent diode, or a light emitting diode.

According to this illumination device, the luminance of the light source can increase.

In the illumination device of the above aspect of the invention, a plurality of lines and a plurality of rows of the plural emission lights may be disposed.

According to this illumination device, the output of the illumination device can increase.

A projector according to another aspect of the invention includes: the illumination device of the above aspect of the invention; a light modulation device which modulates light received from the illumination device according to image information; and a projection device which projects an image formed by the light modulation device.

This projector includes the illumination device which can reduce illuminance unevenness. Thus, the projector can project images having less illuminance unevenness.

BRIEF DESCRIPTION OF THE DRAWINGS

The invention will be described with reference to the accompanying drawings, wherein like numbers reference like elements.

FIGS. 7A and 7B show the model used in the experiment example of the illumination device according to the third embodiment.

FIG. 8 is a table showing conditions of the model used in the experiment example of the illumination device according to the third embodiment.

DESCRIPTION OF EXEMPLARY EMBODIMENTS

Preferred embodiments according to the invention are hereinafter described with reference to the drawings.

1. First Embodiment

Figure 1:
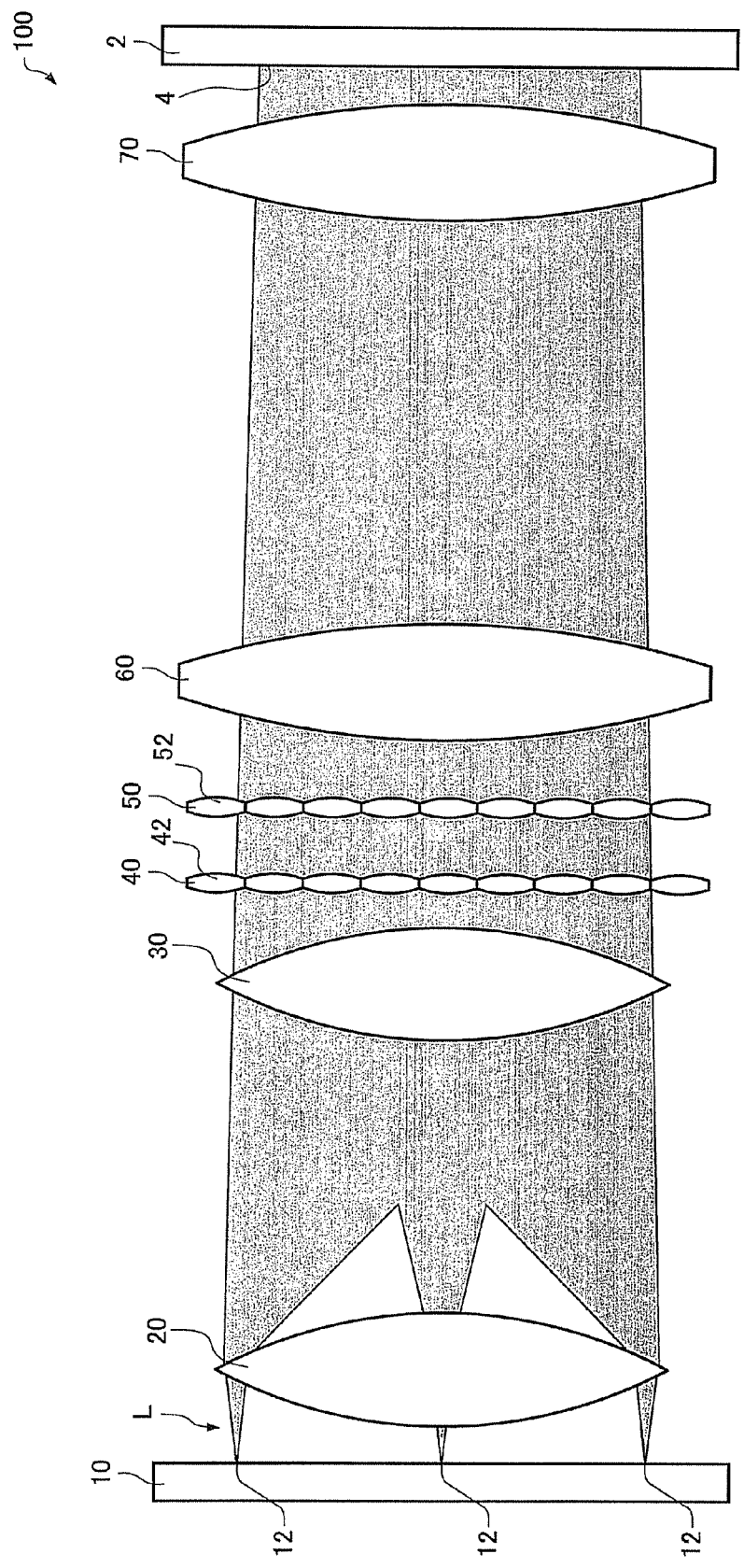
FIG. 1 schematically illustrates an illumination device according to a first embodiment.

An illumination device 100 according to a first embodiment is initially explained. FIG. 1 schematically illustrates the illumination device 100. In this embodiment, the illumination device 100 applied to an illumination device of a projector will be discussed.

As illustrated in FIG. 1, the illumination device 100 includes a light source 10, a first condenser lens 20, a first fly-eye lens 40, and a second condenser lens 60. The illumination device 100 may further include a first field lens 30, a second fly-eye lens 50, and a second field lens 70.

The illumination device 100 has an optical system which contains the light source 10 having a plurality of emission surfaces 12, the first condenser lens 20 for stacking lights L emitted from the plural emission surfaces 12, the first fly-eye lens 40 for dividing the lights stacked by the first condenser lens 20 into a plurality of partial lights, and the second condenser lens 60 for stacking the plural partial lights to supply illumination light onto a light entrance surface 4 of a light valve 2, for example, by using these components 10 through 60.

As illustrated in FIG. 1, the illumination device 100 includes the first condenser lens 20, the first field lens 30, the first fly-eye lens 40, the second fly-eye lens 50, the second condenser lens 60, and the second field lens 70 one for each, for example, on the optical path between the light source 10 and the light entrance surface 4 of the light valve 2. The respective components included in the illumination device 100 are now explained one by one.

The light source 10 is constituted by a solid light source such as a semiconductor laser, a super luminescent diode (SLD), and a light emitting diode (LED), for example. This structure allows the light source 10 to provide high luminance. The light source 10 may have the plural emission surfaces 12. In the example shown in the figure, the light source 10 has the three emission surfaces 12, but the number of the emission surfaces 12 is not specifically limited. Though not shown in the figure, the plural emission surfaces 12 disposed in plural lines and plural rows may be produced by providing a plurality of light emission elements (such as SLD elements) in plural lines and plural rows on a supporting substrate, for example. By this arrangement, lights disposed in the form of arrays (see FIG. 6) can be produced, and the output of the illumination device 100 can be increased. The light source 10 may have an optical element for guiding lights received from the emission surfaces 12 toward the first condenser lens 20. The light source 10 can emit the emission light L from each of the plural emission surfaces 12. The emission light L is divergent light emitted at a predetermined radial angle. The shape of the emission light L on a plane perpendicular to the optical axis is an elliptic shape, for example.

The first condenser lens 20 is an optical element which stacks the lights L emitted from the plural emission surfaces 12. More specifically, the lights L emitted from the plural emission surfaces 12 can be stacked on the first fly-eye lens 40 when supplied thereto by the function of the first condenser lens 20. In this case, the lights L emitted from the plural emission surfaces 12 and having individual light intensity distributions (such as Gaussian distributions) can be stacked on the first fly-eye lens 40 and supplied thereto as lights having the single light intensity distribution by using the first condenser lens 20. By this method, the light intensity distribution of the lights L supplied to the first fly-eye lens 40 becomes more uniform than that of a structure which directly supplies the emission lights L to the first fly-eye lens 40. The first condenser lens 20 can be considered as a stacking lens which stacks the lights L emitted from the plural emission surfaces 12 on the entrance surface of the first fly-eye lens 40.

Figure 2:
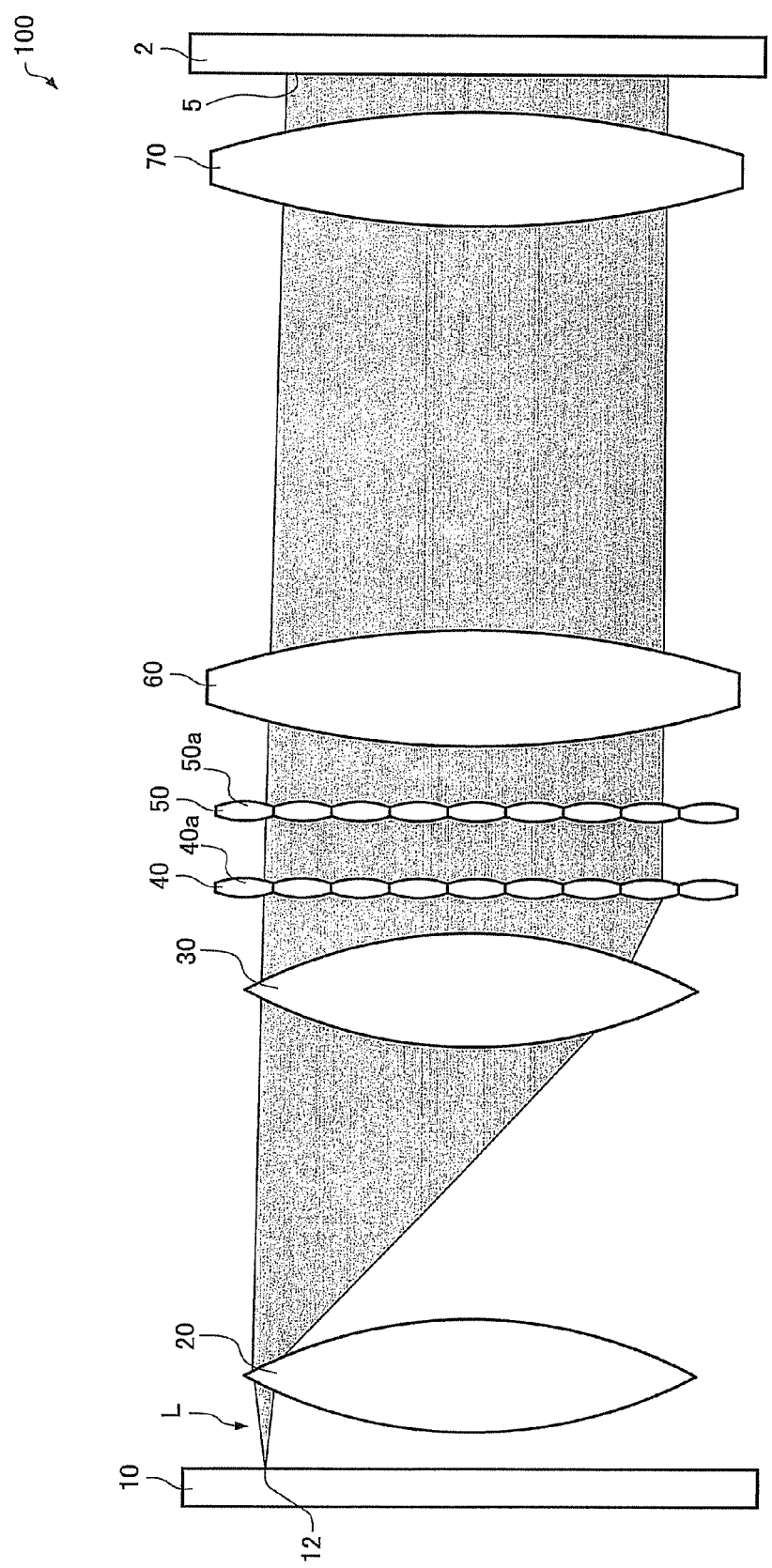
FIG. 2 schematically illustrates the illumination device according to the first embodiment.

FIG. 2 schematically illustrates an optical path of light emitted from one of the plural emission surfaces 12 and reaching the light entrance surface 4 of the light valve 2 in the illumination device 100. As illustrated in FIG. 2, the emission light L as divergent light can be supplied to the first fly-eye lens 40 by using the first condenser lens 20. In this case, the area on the first fly-eye lens 40 to which the emission light L is supplied becomes wider than the area on the first fly-eye lens 40 to which the emission light L is directly supplied. Thus, the size of an illumination receiving area 5 of light emitted from the one emission surface 12 can be almost equalized with the size of the illumination receiving area 4 of lights emitted from the plural emission surfaces 12, for example. This applies to lights emitted from the emission surfaces other than the emission surface 12 shown in FIG. 2.

The first field lens 30 is an optical element which converges lights received from the first condenser lens 20 on the first fly-eye lens 40. The first field lens 30 is disposed on the optical path between the first condenser lens 20 and the first fly-eye lens 40. The first field lens 30 can supply a larger amount of light received from the first condenser lens 20 to the first fly-eye lens 40. Thus, the efficiency of using light can improve. The first field lens 30 may be eliminated.

The first fly-eye lens 40 is an optical element which divides lights stacked by the first condenser lens 20 into plural partial lights. That is, lights stacked by the first condenser lens 20 can be divided into plural partial lights and supplied to the second fly-eye lens 50 by the function of the first fly-eye lens 40. More specifically, the lights stacked by the first condenser lens 20 can be divided into the plural partial lights, individually converged, and then diverged to be supplied to the second fly-eye lens 50 by using the first fly-eye lens 40. The first fly-eye lens 40 contains a plurality of first element lenses 42 disposed in matrix and divides the lights stacked by the first condenser lens 20 into plural partial lights by using the first element lenses 42. The plural first element lenses 42 are disposed within a plane crossing the optical axes at right angles, for example. Each contour shape of the first element lenses 42 is similar to the shape of the illumination receiving area 4 (the light entrance surface 4 of the light valve 2 in the example shown in the figure), for example. The distance between the first condenser lens 20 and the first fly-eye lens 40 is longer than the focal distance of the first condenser lens 20, for example. By this arrangement, lowering of uniformity of illumination light caused by concentration of light on a part of the first fly-eye lens 40 can be prevented. The distance between the first condenser lens 20 and the first fly-eye lens 40 is preferably determined such that the diameter of lights stacked by the first condenser lens 20 on the entrance surface of the first fly-eye lens 40 becomes shorter than the effective diameter of the first condenser lens 20. In this case, lights released from the first fly-eye lens 40 can be supplied to corresponding second element lenses 52 of the second fly-eye lens 50, and thus the efficiency of using light improves. When the lights have an elliptic shape, the diameter of the lights may correspond to the major diameter of the ellipse.

The second fly-eye lens 50 is an optical element which individually converges the plural partial lights divided by the first fly-eye lens 40 on the second condenser lens 60. Thus, the second fly-eye lens 50 can supply a larger amount of the plural partial lights to the second condenser lens 60. Accordingly, the efficiency of using light can improve. Similarly to the first fly-eye lens 40, the second fly-eye lens 50 may contain a plurality of the second element lenses 52 disposed in matrix within a plane crossing the optical axes of lights released from the first fly-eye lens 40 at right angles. The second element lenses 52 of the second fly-eye lens 50 may be disposed at positions corresponding to those of the first element lenses 42 of the first fly-eye lens 40 with one-to-one correspondence. Thus, the number of the second element lenses 52 of the second fly-eye lens 50 is equal to the number of the first element lenses 42 of the first fly-eye lens 40. Since the second fly-eye lens 50 is provided for convergence, each contour shape of the second element lenses 52 is not required to be similar to the shape of the illumination receiving area 4. The second fly-eye lens 50 may be eliminated. By providing an integrator illumination system which includes the first fly-eye lens 40 and the second fly-eye lens 50, illumination light can be equalized.

Each of the second element lenses 52 of the second fly-eye lens 50 may be constructed such that an effective diameter Sf satisfies the following expression (1).

$$Sf \fallingdotseq f2 \times Ss/f1 \tag{1}$$

In the expression (1), Ss is the effective diameter of the first condenser lens 20, f1 is the focal distance of the first condenser lens 20, and f2 is the focal distance of each of the first element lenses 42 of the first fly-eye lens 40. According to this arrangement, the effective diameter of each of the second element lenses 52 of the second fly-eye lens 50 can be made longer than each beam diameter of the lights (partial lights) entering the second element lenses 52. As a result, the efficiency of using light can improve.

The second condenser lens 60 is an optical element which stacks the plural partial lights divided by the first fly-eye lens 40. That is, the plural partial lights divided by the first fly-eye lens 40 can be stacked on the light entrance surface 4 of the light valve 2, for example, by the function of the second condenser lens 60. By this method, the light intensity distribution can be equalized, and illuminance unevenness of illumination light on the light entrance surface 4 of the light valve 2 (illumination receiving area) can be reduced. The second condenser lens 60 can be considered as a stacking lens which stacks the plural partial lights on the light entrance surface 4 of the light valve 2.

The second field lens 70 is an optical element which converges the light received from the second condenser lens 60 on the light entrance surface 4 of the light valve 2, for example. The second field lens 70 can supply a larger amount of the light received from the second condenser lens 60 on the light entrance surface 4 of the light valve 2. Thus, the efficiency of using light can improve. The second field lens 70 may be eliminated.

While the illumination device 100 applied to the illumination device of the projector has been discussed in this embodiment, the illumination device 100 is applicable to a display, an illumination equipment and the like. This applies to the embodiments described later.

The illumination device 100 has the following characteristics, for example.

The illumination device 100 stacks the lights L emitted from the plural emission surfaces 12 on the first fly-eye lens 40 when supplying the lights L thereto by the function of the first condenser lens 20. By this method, the illumination device 100 can supply light having more uniform light intensity distribution to the first fly-eye lens 40 than a structure which does not include the first condenser lens 20. Thus, illuminance unevenness of illumination light on the illumination receiving area 4 can decrease.

According to the illumination device 100, divergent lights can be supplied to the first fly-eye lens 40 by using the first condenser lens 20. Thus, the size of the illumination receiving area 5 of the light L emitted from the one emission surface 12 can be almost equalized with the size of the illumination receiving area 4 of the lights L emitted from the plural emission surfaces 12. Accordingly, even when output of light emitted from a part of the plural emission surfaces 12 is lowered or stopped, for example, illuminance unevenness of illumination light is not produced on the illumination receiving area 4.

2. Second Embodiment

Figure 3:
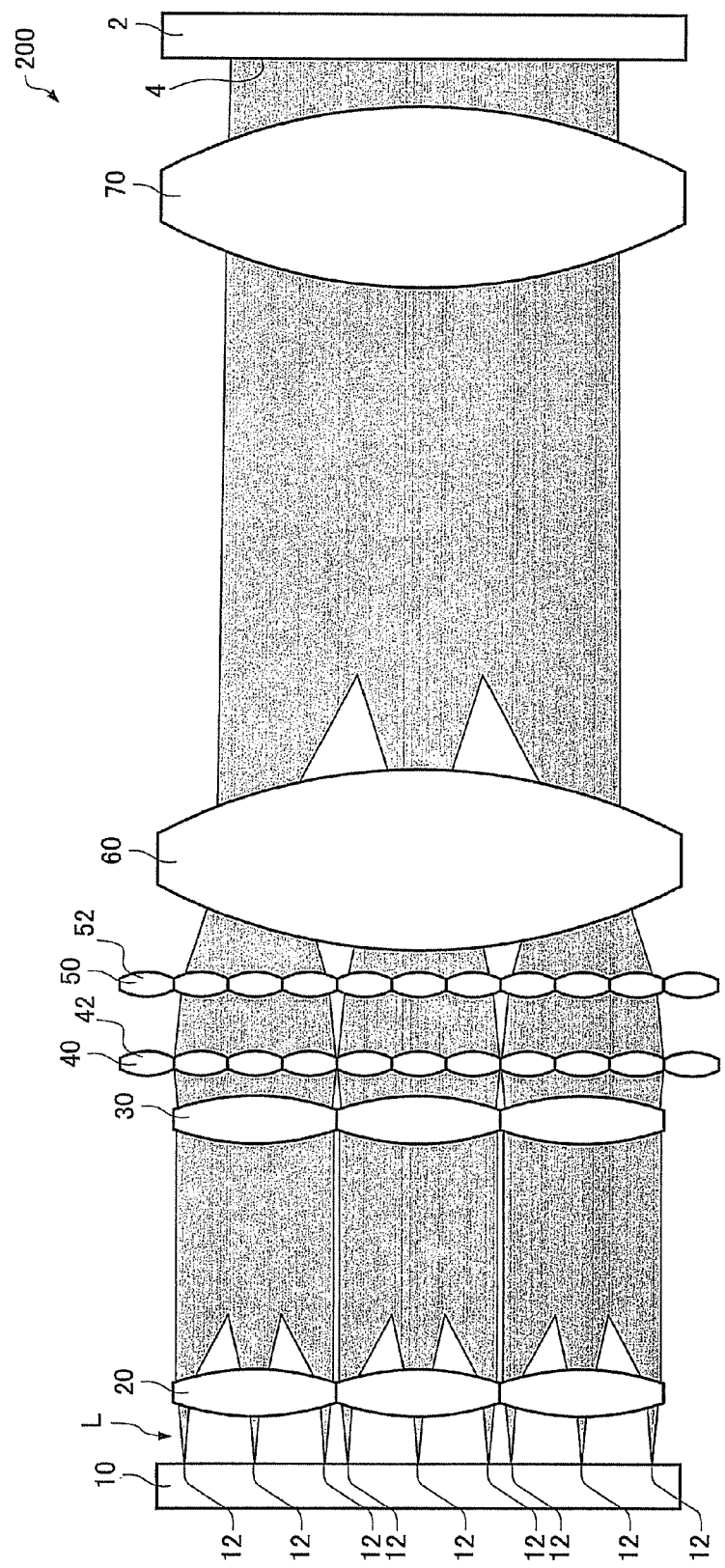
FIG. 3 schematically illustrates an illumination device according to a second embodiment.

An illumination device according to a second embodiment is now described. FIG. 3 schematically illustrates an illumination device 200 in the second embodiment. In the illumination device 200 of the second embodiment, the same reference numbers are given to parts having functions similar to those of the parts included in the illumination device 100 of the first embodiment, and the detailed explanation of the parts is not repeated.

As illustrated in FIG. 3, the illumination device 200 includes the plural first condenser lenses 20. The illumination device 200 may further include the plural first field lenses 30.

As can be seen from FIG. 3, the illumination device 200 may contain the three first condenser lenses 20 for the plural emission surfaces 12, the three first field lenses 30 in correspondence with the first condenser lenses 20, and further the first fly-eye lens 40, the second fly-eye lens 50, the second condenser lens 60, and the second field lens 70 one for each on the optical path between the light source 10 and the light entrance surface 4 of the light valve 2, for example. The numbers of the first condenser lenses 20 and the first field lenses 30 are not specifically limited.

The plural first condenser lenses 20 are disposed within a plane crossing the optical axes of the lights L emitted from the plural emission surfaces 12, for example. The plural first condenser lenses 20 are positioned within a plane crossing the optical axes of the lights L emitted from the plural emission surfaces 12 at right angles, for example. According to the example shown in the figure, the three first condenser lenses 20 are provided, but the number of the first condenser lenses 20 is not specifically limited. The lights L emitted from the plural emission surfaces 12 can be stacked by each of the first condenser lenses 20. According to the example shown in the figure, the lights emitted from the three emission surfaces 12 are stacked by the one corresponding first condenser lens 20. Thus, in the structure including the three first condenser lenses 20, three optical paths of the stacked lights are produced. In this structure, the lights L emitted from the plural emission surfaces 12 can be stacked on the first fly-eye lens 40 by each of the first condenser lenses 20 when supplied to the first fly-eye lens 40. Accordingly, the radial angles of the lights released from the first condenser lenses 20 can be decreased, and thus the incident angles of the lights supplied to the first fly-eye lens 40 can be made smaller than those angles of a structure including the one first condenser lens 20, for example. When the incident angles of lights entering the first fly-eye lens 40 are large, for example, the lights having reached the first element lenses 42 of the first fly-eye lens 40 cannot enter the corresponding second element lenses 52 of the second fly-eye lens 50 in some cases. As a result, the light transmissivity of the second fly-eye lens 50 lowers. However, the illumination device 200 decreases the incident angles of lights entering the first fly-eye lens 40, and thus can reduce lowering of the light transmissivity of the second fly-eye lens 50. The incident angle of the light L entering the first fly-eye lens 40 increases as the distance between the emission surface 12 from which the light L is emitted and the optical axis of the first condenser lens 20 becomes longer. Thus, this embodiment is particularly advantageous when the size of the light source 10 is large.

The plural first condenser lenses 20 may be formed integrally with each other as a first condenser lens array, for example. In this case, the plural first condenser lenses 20 can be produced by a simple process.

The illumination device 200 may include the 160 emission surfaces 12 on the light source 10, the 2 first condenser lenses 20, the 64 first element lenses 42 of the first fly-eye lens 40, and the 64 second element lenses 52 of the second fly-eye lens 50. In this case, the one first condenser lens 20 can stack the lights emitted from the 80 emission surfaces 12 included in the 160 emission surfaces 12 of the light source 10 on the 32 first element lenses 42 of the first fly-eye lens 40.

The first fly-eye lens 40 can divide the lights stacked by each of the first condenser lenses 20 into a plurality of partial lights. The plural partial lights divided by the first fly-eye lens 40 are supplied to the second condenser lens 60 via the second fly-eye lens 50. The second condenser lens 60 can stack the plural partial lights divided by the first fly-eye lens 40 on the light entrance surface 4 of the light valve 2, for example. That is, the plural partial lights divided by the first fly-eye lens 40 can be stacked on the light entrance surface 4 of the light valve 2 by the function of the second condenser lens 60.

Figure 4:
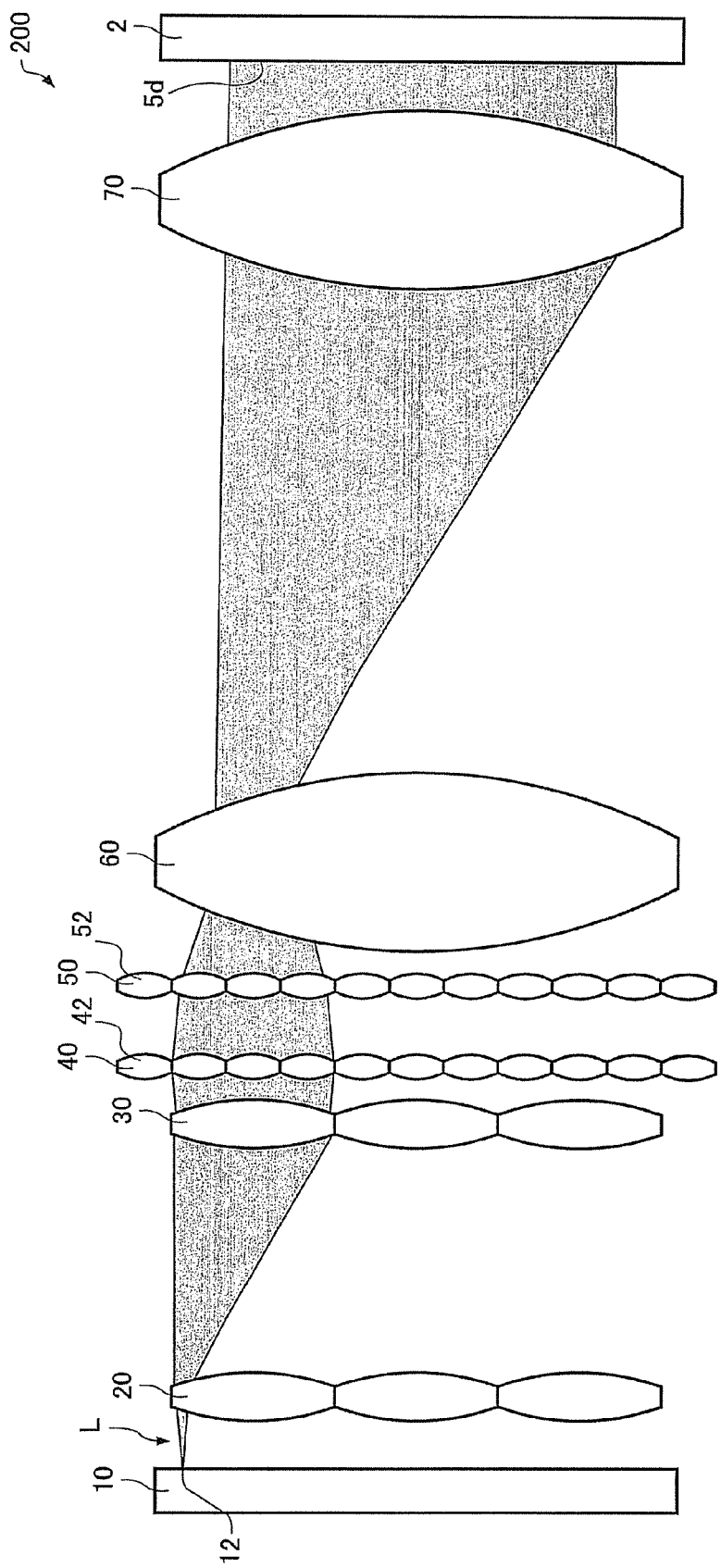
FIG. 4 schematically illustrates the illumination device according to the second embodiment.

FIG. 4 schematically illustrates the optical path of light emitted from one of the plural emission surfaces 12 and reaching the light entrance surface 4 of the light valve 2 in the illumination device 200. As illustrated in FIG. 4, the illumination device 200 can supply the emission lights L as divergent lights to the first fly-eye lens 40 by using the first condenser lens 20. Moreover, the plural partial lights divided by the first fly-eye lens 40 can be individually converged and diverged and then supplied to the light entrance surface 4 of the light valve 2 by using the second condenser lens 60. Thus, the size of an illumination receiving area $5d$ of light emitted from the one emission surface 12 can be almost equalized with the size of the illumination receiving area 4 of lights emitted from the plural emission surfaces 12, for example. This applies to lights emitted from the emission surfaces other than the emission surface 12 shown in FIG. 4.

The illumination device 200 has the following characteristics, for example.

The illumination device 200 has the plural first condenser lenses 20 within the plane crossing the optical axes of the lights L emitted from the plural emission surfaces 12. Thus, the lights L emitted from the plural emission surfaces 12 can be stacked by each of the first condenser lenses 20. In this case, the incident angles of the lights entering the first fly-eye lens 40 can be decreased, and thus lowering of the light transmissivity of the second fly-eye lens 50 can be reduced, for example. As a result, the efficiency of using light can improve. Moreover, lights having more uniform light intensity distribution can be supplied to the first fly-eye lens 40 than in a structure which does not include the first condenser lenses 20. Thus, illuminance unevenness of illumination light on the illumination receiving area 4 can be reduced.

According to the illumination device 200, divergent lights can be supplied to the first fly-eye lens 40 by using the first condenser lens 20. In addition, the plural partial lights divided by the first fly-eye lens 40 can be individually converged and diverged and then supplied to the light entrance surface 4 of the light valve 2. Thus, the size of the illumination receiving area $5d$ of light emitted from the one emission surface 12 can be almost equalized with the size of the illumination receiving area 4 of lights emitted from the plural emission surfaces 12. Accordingly, even when output of light emitted from a part of the plural emission surfaces 12 is lowered or stopped, for example, illuminance unevenness of illumination light is not produced on the illumination receiving area 4.

3. Third Embodiment (1) Illumination Device

Figure 5:
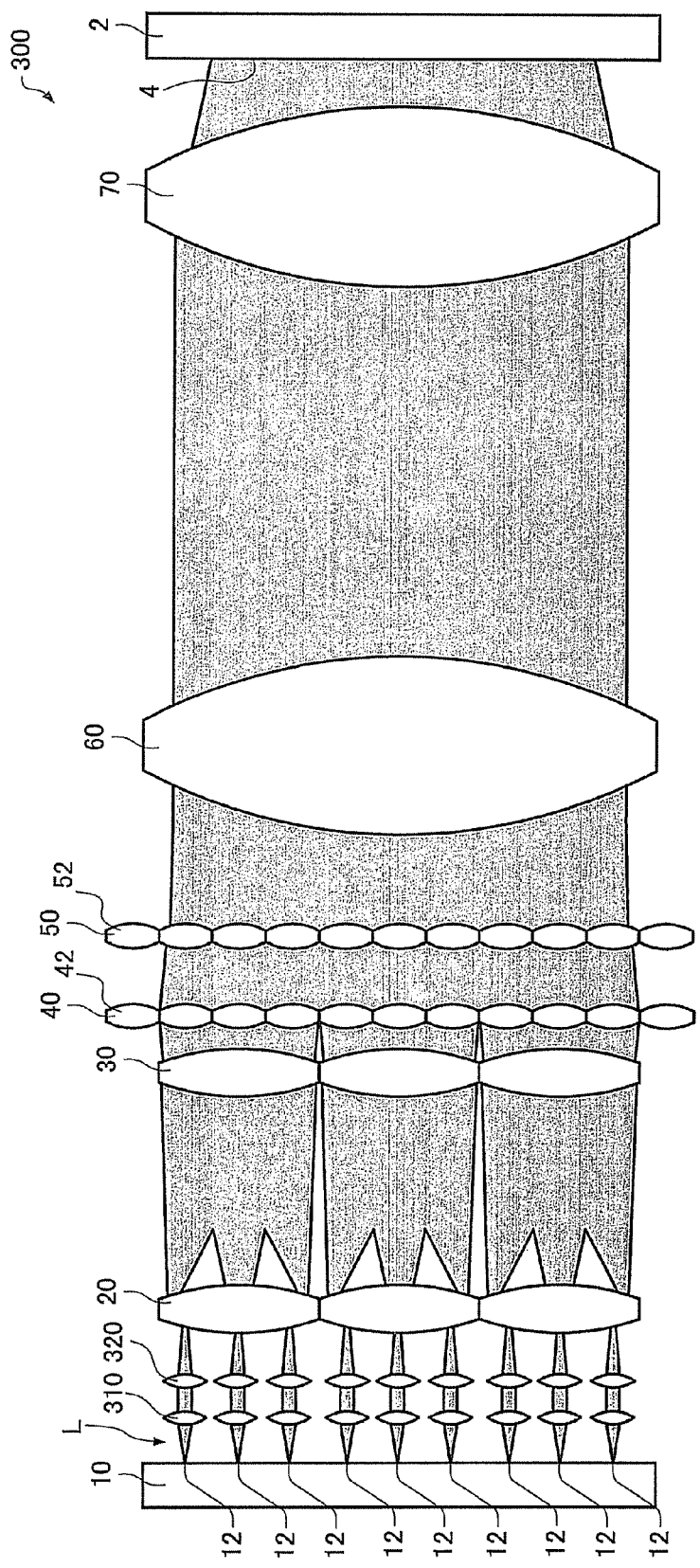
FIG. 5 schematically illustrates an illumination device according to a third embodiment.

An illumination device 300 according to a third embodiment is now described. FIG. 5 schematically illustrates the illumination device 300. In the illumination device 300 of the third embodiment, the same reference numbers are given to parts having functions similar to those of the parts included in the illumination device 200 of the second embodiment, and the detailed explanation of the parts is not repeated.

As illustrated in FIG. 5, the illumination device 300 may further include collimating lenses 310 disposed on the optical path between the emission surfaces 12 and the first condenser lenses 20, and converging lenses 320 disposed between the collimating lenses 310 and the first condenser lenses 20.

As can be seen from FIG. 5, the illumination device 300 may contain the nine collimating lenses 310 in correspondence with the nine emission surfaces 12, the nine converging lenses 320 in correspondence with the collimating lenses 310, the three first condenser lenses 20 in correspondence with the nine collimating lenses 310, the three first field lenses 30 in correspondence with the first condenser lenses 20, and further include the first fly-eye lens 40, the second fly-eye lens 50, the second condenser lens 60, and the second field lens 70 one for each on the optical path between the light source 10 and the light entrance surface 4 of the light valve 2. The numbers of the collimating lenses 310, the converging lenses 320, the first condenser lenses 20, and the first field lenses 30 are not specifically limited.

The collimating lenses 310 are optical elements which convert the lights L emitted from the plural emission surfaces 12 into collimated lights. That is, the collimating lenses 310 convert the lights L emitted from the plural emission surfaces 12 into collimated lights and supply the collimated lights to the converging lenses 320. The plural collimating lenses 310 are provided in correspondence with the plural emission surfaces 12. The collimating lenses 310 are equipped for the emission surfaces 12 with one-to-one correspondence, for example. That is, the number of the collimating lenses 310 is equal to the number of the emission surfaces 12, for example.

The converging lenses 320 are optical elements which converge the lights collimated by the collimating lenses 310. That is, the lights collimated by the collimating lenses 310 can be converged on the first condenser lenses 20 by the function of the converging lenses 320. Thus, the efficiency of using light improves. Moreover, the collimated lights can be converged and then diverged by using the converging lenses 320. Thus, lights can be supplied to a wider area on the first fly-eye lens 40.

According to the illumination device 300, the emission lights L can be converted into collimated lights by using the collimating lenses 310. In this case, the incident angles of the lights supplied to the first condenser lenses 20 can be controlled, and thus the incident angles of the lights supplied to the first fly-eye lenses 40 can be easily controlled by using the first condenser lenses 20. Accordingly, the degree of freedom in designing the optical system is higher than that of a structure which directly supplies the emission lights L to the first condenser lenses 20.

According to the illumination device 300, the efficiency of using light can be increased, and illuminance unevenness of illumination light can be reduced similarly to the illumination device 200.

(2) Example of Experiment

Figure 6:
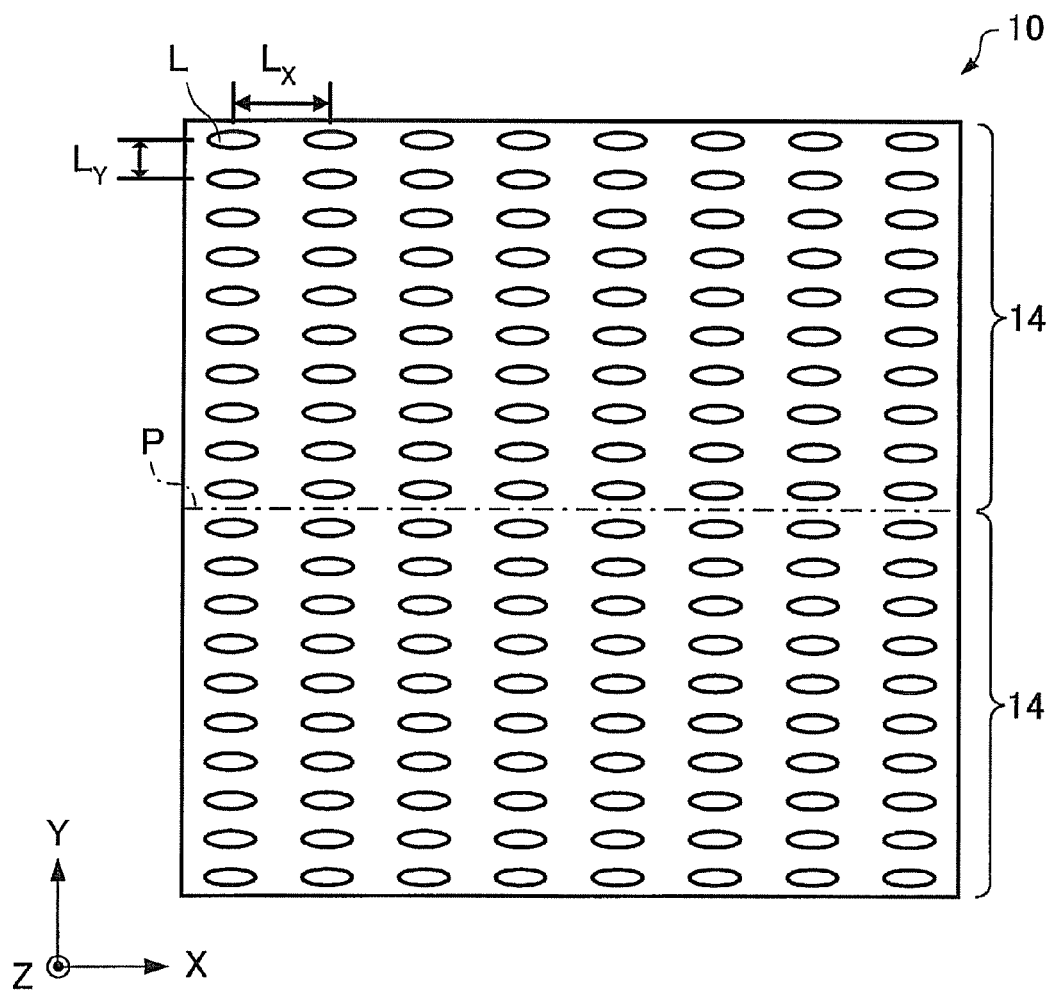
FIG. 6 illustrates a model used in an experiment example of the illumination device according to the third embodiment.
Figure 9:
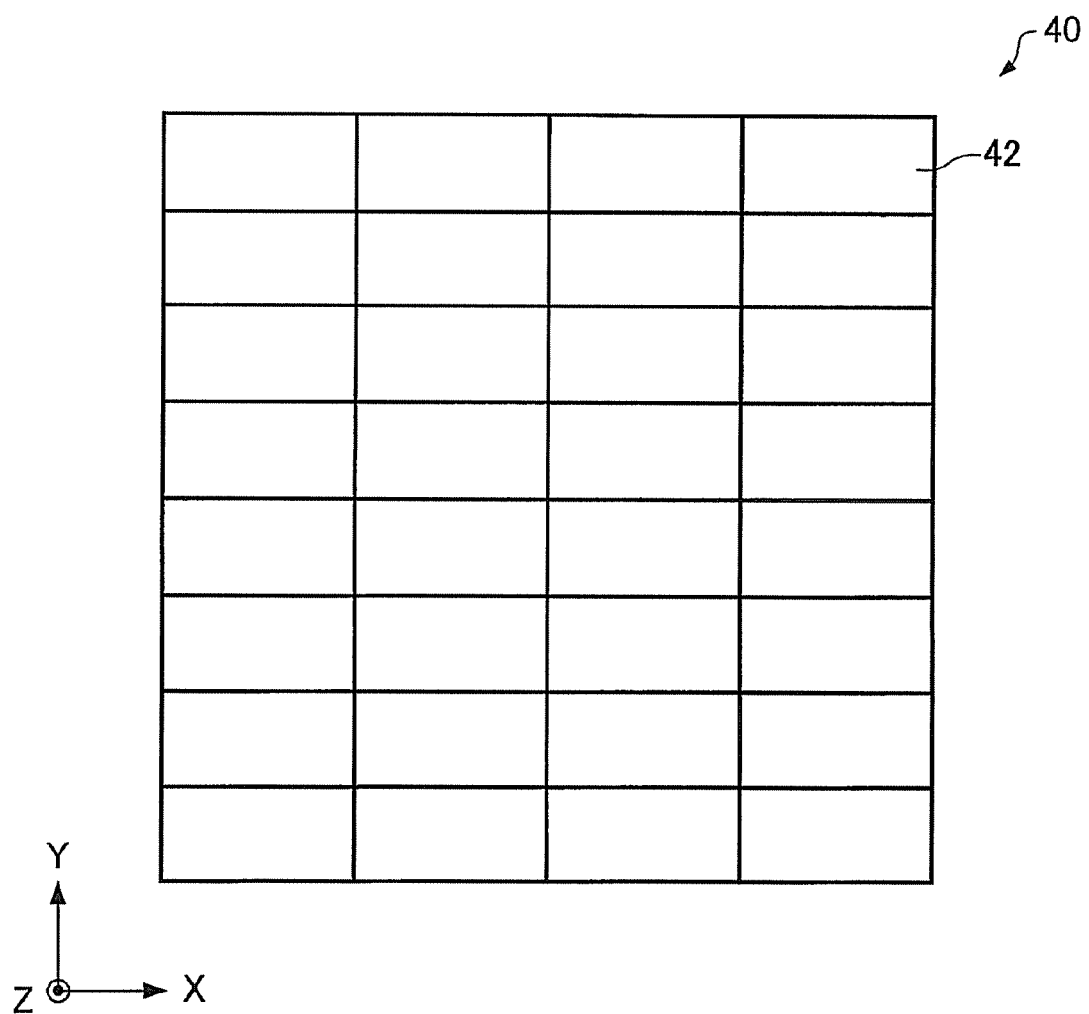
FIG. 9 illustrates the model used in the experiment example of the illumination device according to the third embodiment.
Figure 10:
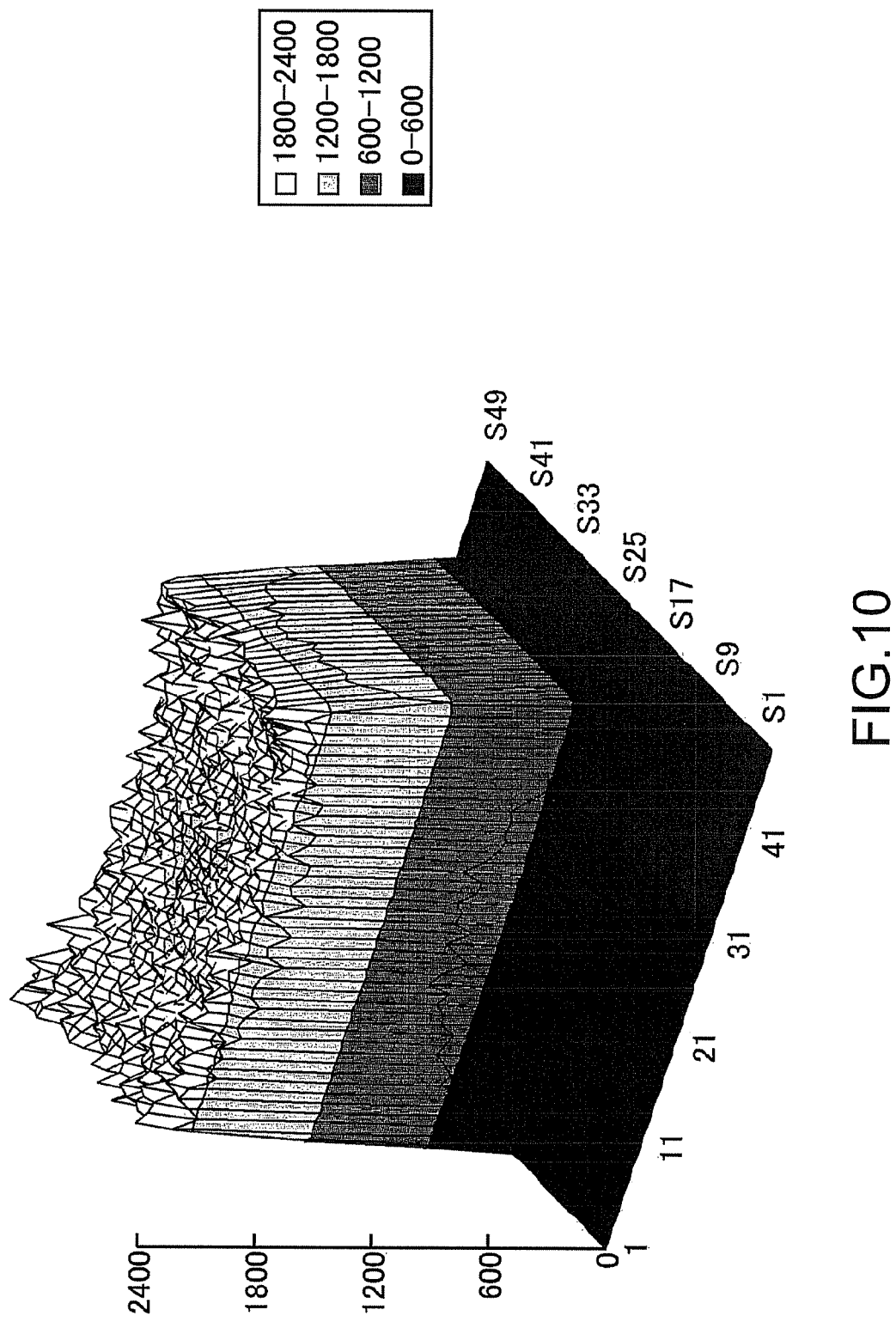
FIG. 10 is a graph showing the result of the experiment example of the illumination device according to the third embodiment.

An experiment example of the illumination device according to the third embodiment is now explained. More specifically, a simulation using a model M as a model of the illumination device 300 according to this embodiment is discussed. FIG. 6 is a plan view schematically illustrating the light source 10 of the model M. FIG. 7A schematically illustrates an optical system of the model M. FIG. 7B is an enlarged part of the optical system shown in FIG. 7A. FIG. 8 is a table showing distances between lens surfaces and radii of curvature of the model M. FIG. 9 is a plan view schematically illustrating the first fly-eye lens 40 of the model M. FIG. 10 is a graph showing the result of the simulation using the model M.

In this experiment, the positions on the light entrance surface 4 of the light valve 2 for receiving respective lights emitted from the light source 10 via the respective lenses 310, 320, 20, 30, 40, 50, 60, and 70 are calculated by using a ray tracing method. Then, illuminance unevenness of illumination light is evaluated based on the calculations.

The structure of the model M is initially explained.

As illustrated in FIG. 6, the light source 10 of the model M has emission surfaces for emitting the emission lights L within the X-Y plane. The emission surfaces have 8 lines in the X direction and 20 lines in the Y direction. The plane on which the emission surfaces of the light source 10 are disposed has a square shape which is 16 mm long for each side. Each interval $L_X$ between the emission surfaces in the X direction is 2.0 mm, and each interval $L_Y$ in the Y direction is 0.8 mm. The plane on which the emission surfaces are disposed is divided into two areas by a vertical bisector P of the sides in parallel with the Y direction, and the emission surfaces disposed on the divided two areas constitute emission surface groups 14a and 14b. Thus, one of the emission surface groups 14 contains 8 lines of the emission surfaces in the X direction and 10 lines of the emission surfaces in the Y direction, respectively. The two first condenser lenses 20 and the two first field lenses 30 are provided in correspondence with the emission surface groups 14a and 14b. The emission lights L are lights emitted from point light sources. Each radial angle of the emission lights L is 60 degrees in the X direction and 30 degrees in the Y direction. The total number of the lights emitted from the light source 10 is 2,000,000.

As illustrated in FIGS. 7A and 7B, the optical system of the model M includes the collimating lenses 310, the converging lenses 320, the first condenser lenses 20, the first field lenses 30, the first fly-eye lens 40, the second fly-eye lens 50, the second condenser lens 60, and the second field lens 70 in this order in the Z direction from the light source 10. The respective lenses are made of BK7, and have refractive index of 1.51872. The distances between the lens surfaces of the respective lenses and the lens surfaces of the lenses disposed next and the radii of curvature of the lens surfaces are shown in the table of FIG. 8. In the table shown in FIG. 8, a first surface corresponds to the light entrance surface to which light is supplied, and a second surface corresponds to the light exit surface from which light is released. Thus, the distance shown in the column of the first surface indicates the thickness of the corresponding lens, and the distance in the column of the second surface indicates the distance from the second surface to the first surface of the next lens. The distance in the column of the second surface of the second field lens 70 indicates the distance to the light entrance surface 4 of the light valve 2. Concerning the sign in the column of the radius of curvature, "+" indicates a convex shape in the −Z direction, and "−" indicates a convex shape in the +Z direction. The lens conditions of the first and second fly-eye lenses 40 and 50 shown in FIG. 8 correspond to the lens conditions of the respective element lenses 42 and 52. According to the model M, each of the collimating lenses 310 and each of the converging lenses 320 are provided as a lens having the collimating surface as the first surface and the converging surface as the second surface. The collimating surface is an aspherical surface which has a Conic constant of −2.295788. The converging surface is a spherical surface. The first surface and the second surface of each of the other lenses 20, 30, 42, 52, 60, and 70 are spherical surfaces. The respective lenses included in the optical system of the model M are designed such that F numbers become 2.2 or larger. In the simulation, the lens loss of the respective lenses 310, 320, 20, 30, 40, 50, 60, and 70 are not considered.

As illustrated in FIG. 9, the first fly-eye lens 40 of the model M has a square shape which is 16 mm long for each side on the X-Y plane. Each of the first element lenses 42 has a rectangular shape having a 3.56 mm side in parallel with the X axis and a 2.0 mm side in parallel with the Y axis. Thus, the first fly-eye lens 40 has 4 lines of the first element lenses 42 in the X direction, and 8 lines of the first element lenses 42 in the Y direction. Each shape of the first element lenses 42 is similar to the shape of the light entrance surface 4 of the light valve 2 within the X-Y plane. The second fly-eye lens 50 has the same shape as the shape of the first fly-eye lens 40, and each of the first element lenses 42 has the same shape as each shape of the second element lenses 52 within the X-Y plane.

The result of the simulation is now explained.

As illustrated in FIGS. 7A and 7B, a part of lights emitted from the light source and reaching the illumination receiving area travels toward the illumination receiving area along optical paths indicated by fine solid lines and broken lines in the figure. FIG. 10 illustrates the three-dimensional distribution showing the numbers of lights entering the respective unit areas on a plane containing the light entrance surface 4 of the light valve 2. The height and the gradation of darkness and brightness in FIG. 10 indicate the numbers of lights entering the respective unit areas. Each unit area has a square shape which is 0.5 mm long for each side. The light entrance surface 4 of the light valve 2 is an area within a rectangular shape having vertexes positioned at coordinates (5, 14), (5, 36), (46, 14), and (46, 36).

As can be seen from FIG. 10, there are only small variances of the number of lights entering the respective unit areas on the light entrance surface 4 of the light valve 2. More specifically, when the largest number of lights entering the unit area on the light entrance surface 4 of the light valve 2 is 100, the smallest number of lights entering the unit area is 76. Thus, the model M can produce preferable illumination light having less illuminance unevenness on the light entrance surface 4 of the light valve 2.

It is therefore confirmed that the illumination device 300 can produce preferable illumination light having less illuminance unevenness.

4. Fourth Embodiment

Figure 11:
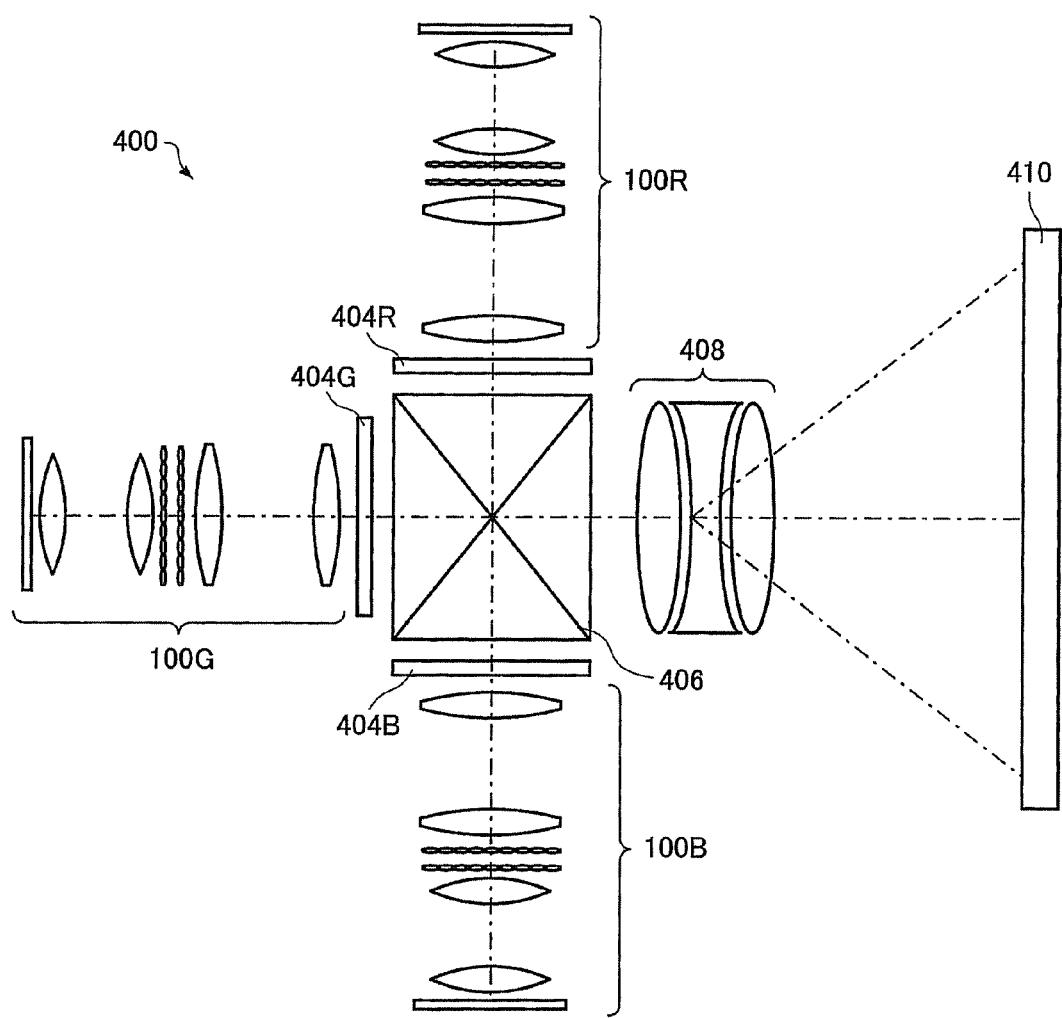
FIG. 11 schematically illustrates a projector according to a fourth embodiment.

A projector 400 according to a fourth embodiment is now described. FIG. 11 schematically illustrates the projector 400. FIG. 11 does not show a housing of the projector 400 for easy understanding of the figure. The projector 400 includes the illumination devices according to the embodiments of the invention. In this embodiment, the projector 400 contains the illumination devices 100 as the illumination devices according to the embodiments of the invention.

Each of an illumination device 100R for red light, an illumination device 100G for green light, and an illumination device 100B for blue light included in the projector 400 is constituted by the illumination device 100 described above.

The projector 400 includes transmission-type liquid crystal light valves (light modulation devices) 404R, 404G, and 404B for modulating lights emitted from the illumination devices 100R, 100G, and 100B according to image information, and a projection lens (projection device) 408 for expanding images formed by the liquid crystal light valves 404R, 404G, and 404B and projecting the expanded images on a screen (display surface) 410. The projector 400 may further include a cross dichroic prism (color combining unit) 406 for combining the lights received from the liquid crystal light valves 404R, 404G, and 404B and guiding the combined light to the projection lens 408.

The three color lights modulated by the respective liquid crystal light valves 404R, 404G, and 404B enter the cross dichroic prism 406. This prism is produced by affixing four rectangular prisms, and contains a dielectric multilayer film for reflecting red light and a dielectric multilayer film for reflecting blue light disposed in a cross shape on the inner surfaces of the prisms. The three color lights are combined by these dielectric multilayer films and formed into light displaying a color image. The combined light is projected on the screen 410 by using the projection lens 408 as the projection system to display an expanded image.

While the transmission-type liquid crystal light valves are used as the light modulation devices in this embodiment, the light modulation devices may be light valves of types other than the liquid crystal type, or reflection-type light valves. Examples of these light valves involve reflection-type liquid crystal light valves and digital micromirror devices. The structure of the projection system is changed according to the types of light valves to be used.

The illumination device 100 can be applied to an illumination device included in a scanning-type image display apparatus (projector) which has a scanning unit as an image forming device for displaying images of a desired size on a display surface by using light emitted from the illumination device 100 for scanning on a screen.

Since the projector 400 is provided with the illumination devices which can reduce illuminance unevenness, the projector 400 can project images having less illuminance unevenness.

The invention is not limited to the embodiments and modified examples described herein. For example, the embodiments and modified examples may be combined in appropriate manners.

While the embodiments according to the invention have been described in detail, it is easily understood by those skilled in the art that various modifications can be made substantially without departing from novel matters and advantages of the invention. It is therefore intended that these modifications are all included in the scope of the invention.

The entire disclosure of Japanese Patent Application No. 2009-261732, filed Nov. 17, 2009 is expressly incorporated by reference herein.

What is claimed is:

1. An illumination device comprising:
a light source which emits a plurality of emission lights;
a first condenser lens which stacks the plural emission lights emitted from the light source;
a first fly-eye lens which divides lights stacked by the first condenser lens into a plurality of partial lights;
a second fly-eye lens which converges the plural partial lights;
a second condenser lens which stacks the plural partial lights converged by the second fly-eye lens; and
a plurality of converging lenses provided in correspondence with the plural emission lights on an optical path between the light source and the first condenser lens to individually converge the plural emission lights emitted from the light source,
wherein
the first condenser lens stacks the plural emission lights emitted from the light source on the first fly-eye lens,
the second fly-eye lens stacks the plural partial lights on an illumination receiving area,
the plural first condenser lenses are disposed within a plane crossing the optical axes of the plural emission lights emitted from the light source, and
the plural emission lights emitted from the light source are stacked on the first fly-eye lens by each of the first condenser lenses.

2. The illumination device according to claim 1, wherein
the distance between the first condenser lens and the first fly-eye lens is longer than the focal distance of the first condenser lens; and
the diameter of the lights stacked on the light entrance surface of the first fly-eye lens by the first condenser lens is shorter than the effective diameter of the first condenser lens.

3. The illumination device according to claim 1, wherein
the first fly-eye lens has a plurality of first element lenses disposed within a plane crossing the lights stacked by the first condenser lens at right angles;
the second fly-eye lens has a plurality of second element lenses disposed within a plane crossing the lights received from the first fly-eye lens at right angles; and
an effective diameter Sf of each of the second element lenses satisfies the following expression (1)

$$Sf \geq f2 \times Ss/f1 \qquad (1)$$

(Ss: effective diameter of the first condenser lens, f1: focal distance of the first condenser lens, f2: focal distance of each of the first element lenses).

4. The illumination device according to claim 1, further comprising a plurality of collimating lenses provided in correspondence with the plural emission lights on an optical path between the light source and the converging lenses to individually convert the plural emission lights emitted from the light source into collimated lights.

5. The illumination device according to claim 1, further comprising a field lens disposed on an optical path between the first condenser lens and the first fly-eye lens to converge the lights stacked by the first condenser lens on the first fly-eye lens.

6. The illumination device according to claim 1, wherein the light source is a semiconductor laser, a super luminescent diode, or a light emitting diode.

7. The illumination device according to claim 1, wherein a plurality of lines and a plurality of rows of the plural emission lights are disposed.

8. A projector comprising:
the illumination device according to claim 1;
a light modulation device which modulates light received from the illumination device according to image information; and
a projection device which projects an image formed by the light modulation device.

* * * * *